United States Patent
Tanaka

(10) Patent No.: US 11,320,725 B2
(45) Date of Patent: May 3, 2022

(54) PROJECTION TYPE DISPLAY APPARATUS, PROJECTION TYPE DISPLAY SYSTEM, CONTROL METHOD OF PROJECTION TYPE DISPLAY APPARATUS, AND STORAGE MEDIUM

(71) Applicant: CANON KABUSHIKI KAISHA, Tokyo (JP)

(72) Inventor: Junichi Tanaka, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 17/093,754

(22) Filed: Nov. 10, 2020

(65) Prior Publication Data

US 2021/0157218 A1 May 27, 2021

(30) Foreign Application Priority Data

Nov. 22, 2019 (JP) .............................. JP2019-211088
Oct. 26, 2020 (JP) .............................. JP2020-178992

(51) Int. Cl.
*G03B 21/14* (2006.01)
*H04N 9/31* (2006.01)

(52) U.S. Cl.
CPC ......... *G03B 21/142* (2013.01); *G03B 21/147* (2013.01); *H04N 9/3185* (2013.01)

(58) Field of Classification Search
CPC ...... G03B 21/00; G03B 21/14; G03B 21/142; G03B 21/147; G03B 21/53; H04N 9/31; H04N 9/3185

USPC ............................. 353/69, 70, 101, 121, 122
See application file for complete search history.

(56) References Cited

U.S. PATENT DOCUMENTS

| | | | |
|---|---|---|---|
| 10,036,940 B2* | 7/2018 | Tanaka | G02B 27/0025 |
| 10,324,364 B2* | 6/2019 | Tanaka | G02B 7/09 |
| 10,466,574 B2* | 11/2019 | Kobayashi | G03B 21/142 |
| 10,901,308 B2* | 1/2021 | Tanaka | G03B 21/147 |
| 10,983,424 B2* | 4/2021 | Kobayashi | H04N 9/317 |
| 2010/0177253 A1* | 7/2010 | Golub | H04N 9/3161 349/8 |
| 2020/0225567 A1* | 7/2020 | Kano | G03B 21/147 |

FOREIGN PATENT DOCUMENTS

JP 6428885 B2 2/2014

* cited by examiner

*Primary Examiner* — William C. Dowling
(74) *Attorney, Agent, or Firm* — Rossi, Kimms & McDowell LLP

(57) ABSTRACT

A projection type display apparatus which includes an optical system having an adjuster configured to adjust a field curvature of an in-focus plane of a projection image includes at least one processor or circuit configured to execute a plurality of tasks including an acquisition task configured to acquire position information of a predetermined position in an imaging area of an image generator and an optical axis of the optical system, and a control task configured to acquire an adjusting amount of a tilt unit configured to tilt the in-focus plane, using information from the acquisition task, a field curvature amount of the in-focus plane based on a position of the adjuster, and information on a projection target.

17 Claims, 17 Drawing Sheets

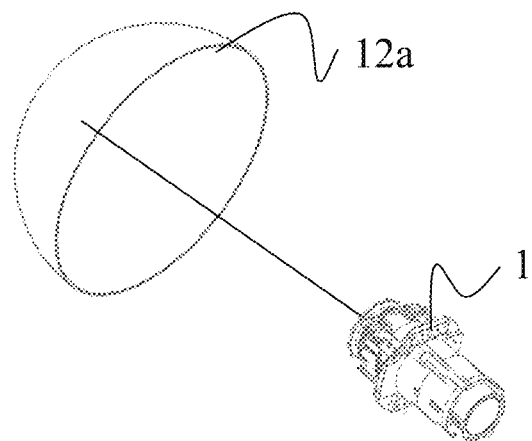
FIG. 11A
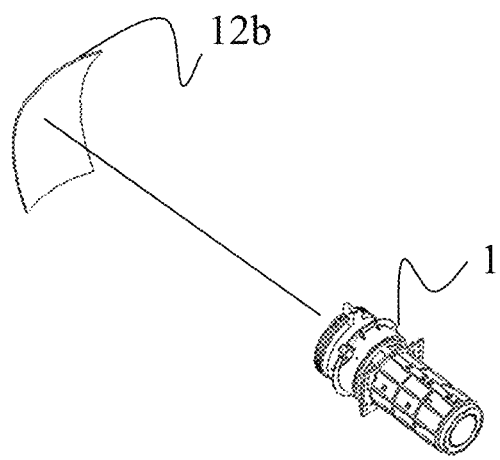 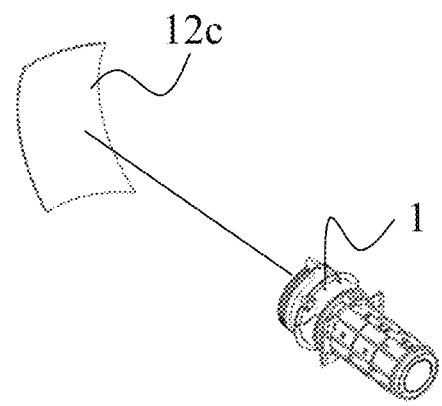
FIG. 11B  FIG. 11C

PROJECTION TYPE DISPLAY APPARATUS, PROJECTION TYPE DISPLAY SYSTEM, CONTROL METHOD OF PROJECTION TYPE DISPLAY APPARATUS, AND STORAGE MEDIUM

BACKGROUND OF THE INVENTION

Field of the Invention

The present invention relates to a projection type display apparatus, a projection type display system, a control method of projection type display apparatus, and a storage medium.

Description of the Related Art

Projection type display apparatuses have recently been used to project a projection image onto a curved projection target. Since the curved projection target has a depth in an optical axis direction, an image position may be outside a permissible depth of the projection optical system in the entire projection target and cause an out-of-focus area. Japanese Patent No. ("JP") 5428885 discloses a projection type display apparatus that can adjust a level of an image plane due to the field curvature by changing a distance between at least two lens units according to a concave or convex shape of the projection target.

In order to adjust the position of the projection image, the projection type display apparatus may move the projection optical system such that an optical axis of an image generator (optical axis incident on the projection optical system) and the optical axis of the projection optical system shift from each other (do not accord with each other). When the projection optical system that intentionally generates a field curvature is moved, a focal plane tilts relative to a plane orthogonal to the optical axis. At this time, accurate fitting of the opposite curved projection target is unavailable. JP 5428885 is silent about moving the projection optical system that generates the field curvature.

SUMMARY OF THE INVENTION

The present invention provides a projection type display apparatus, a projection type display system, a control method of the projection type display apparatus, and a storage medium, each of which can adjust a field curvature and provide an easy tilt control when a projection optical system is moved.

A projection type display apparatus according to one aspect of the present invention which includes an optical system having an adjuster configured to adjust a field curvature of an in-focus plane of a projection image includes at least one processor or circuit configured to execute a plurality of tasks including an acquisition task configured to acquire position information of a predetermined position in an imaging area of an image generator and an optical axis of the optical system, and a control task configured to acquire an adjusting amount of a tilt unit configured to tilt the in-focus plane, using information from the acquisition task, a field curvature amount of the in-focus plane based on a position of the adjuster, and information on a projection target.

A projection display system according to another aspect includes an optical system that includes an adjuster configured to adjust a field curvature of an in-focus plane of a projection image, and at least one processor or circuit configured to execute a plurality of tasks including an acquisition task configured to acquire position information of a predetermined position in an imaging area of an image generator and an optical axis of the optical system, and a control task configured to acquire an adjusting amount of a tilt unit configured to tilt the in-focus plane, using information from the acquisition task, a field curvature amount of the in-focus plane based on a position of the adjuster, and information on a projection target.

A control method of a projection type display apparatus according to another aspect of the present invention includes the steps of acquiring information on a projection target, acquiring a field curvature amount of an in-focus plane based on a position of an adjuster configured to adjust a field curvature of the in-focus plane of a projection image, acquiring position information of a predetermined position in an imaging area of an image generator and an optical axis of the optical system that includes the adjuster, and acquiring an adjusting amount of a tilt unit configured to tilt the in-focus plane, using information on the projection target, a field curvature amount of the in-focus plane, and position information of an optical axis of the image generator and the optical axis of the optical system.

A non-transitory computer-readable storage medium storing a program for causing a computer to execute the control method also constitutes another aspect of the present invention.

Further features of the present invention will become apparent from the following description of exemplary embodiments with reference to the attached drawings.

BRIEF DESCRIPTION OF THE DRAWINGS

FIGS. 11A to 11C illustrate a relationship between the projection lens and the focal plane.

DESCRIPTION OF THE EMBODIMENTS

Figure 1:
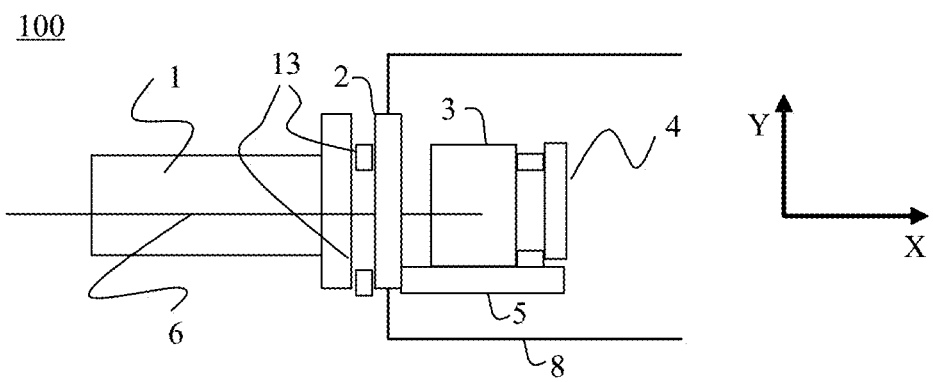
FIG. 1 illustrates a configuration of a projection type display system according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

FIG. 1 illustrates a configuration of a projection type display system 100 according to one embodiment of the present invention. The projection type display system 100 includes a projection lens (optical system) 1 having (storing) optical elements and a projection type display apparatus 8 to which the projection lens 1 is detachably attached, and projects a projection image on a projection target (screen, projected target surface).

Figure 2:
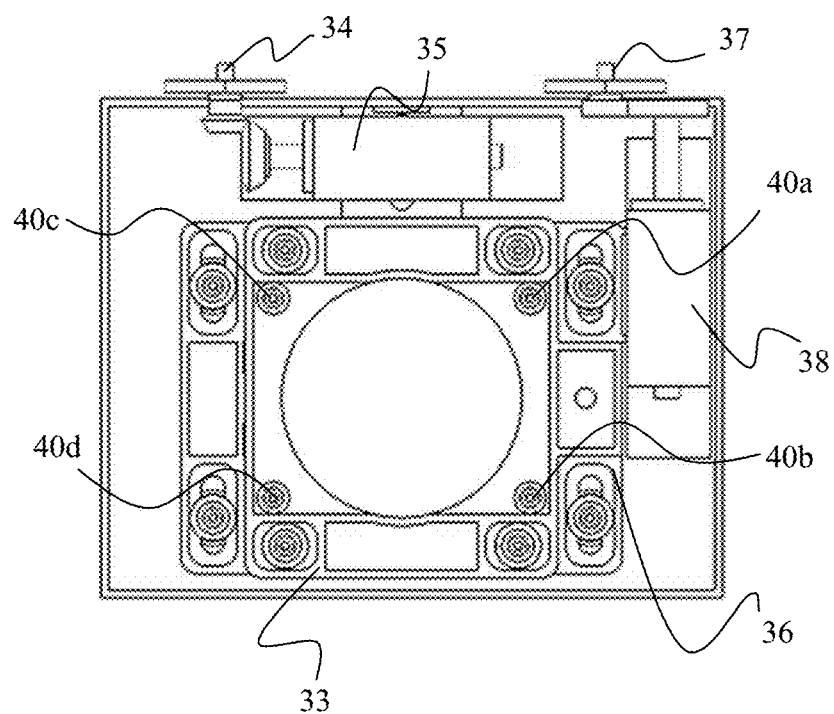
FIG. 2 is an explanatory diagram of a shift unit.

A shift unit (shifter) 2 movably holds the projection lens 1 in a plane (YZ plane, a plane parallel to an imaging area of an image generator (image generation task or unit 4) orthogonal to an optical axis 6 of the image generator 4, which will be described later. FIG. 2 is an explanatory diagram of the shift unit 2. When a Z-direction moving dial 34 is operated, a Z-direction moving plate 33 moves in the Z direction together with the projection lens 1. A Z-direction position detecting sensor (acquisition task or unit) 35 detects a position of the Z-direction moving plate 33. When a Y-direction moving dial 37 is operated, a Y-direction moving plate 36 moves in the Y direction together with the projection lens 1. A Y-direction position detecting sensor (acquisition task) 38 detects a position of the Y-direction moving plate 36.

While this embodiment moves the projection lens 1 by a manual operation, the projection lens 1 may be moved by an electric driving force of a motor or the like. This embodiment movably holds the projection lens 1 in a plane orthogonal to the optical axis, but the present invention is not limited to this embodiment. The projection lens 1 may be fixed to the projection type display apparatus 8 in a state where the optical axis of the image generator 4 (optical axis incident on the projection lens 1) 6 and the optical axis of the projection lens 1 shift from each other.

Figure 3A:
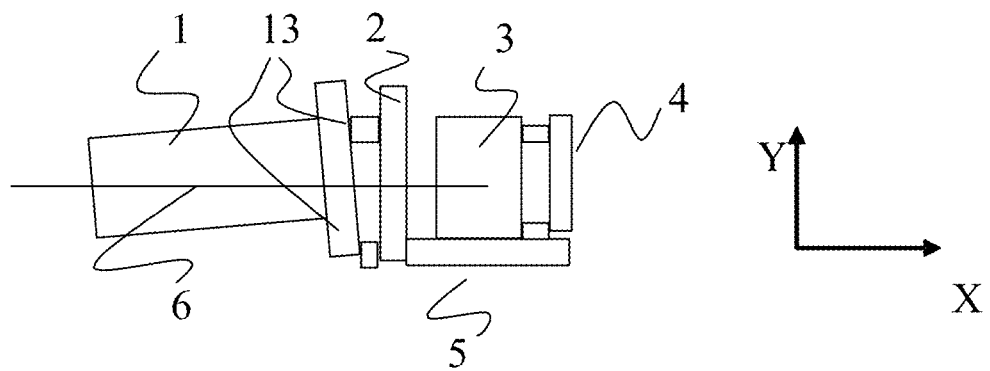
FIGS. 3A and 3B illustrate the projection type display system when a projection lens is tilted.
Figure 3B:
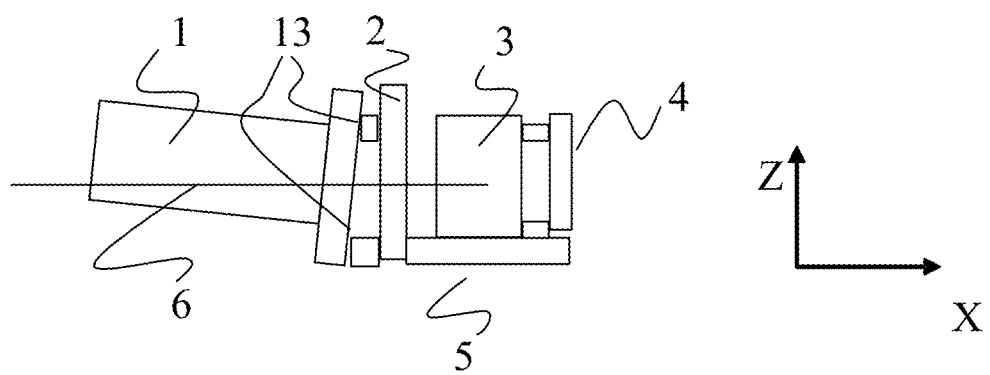

A lens tilting pin 13 is disposed between the projection lens 1 and the shift unit 2. As the lens tilting pin 13 moves in the optical axis direction, the projection lens 1 can tilt to the optical axis 6 of the image generator 4 as illustrated in FIGS. 3A and 3B. Thereby, the focal plane (in-focus plane) is tilted.

Figure 4:
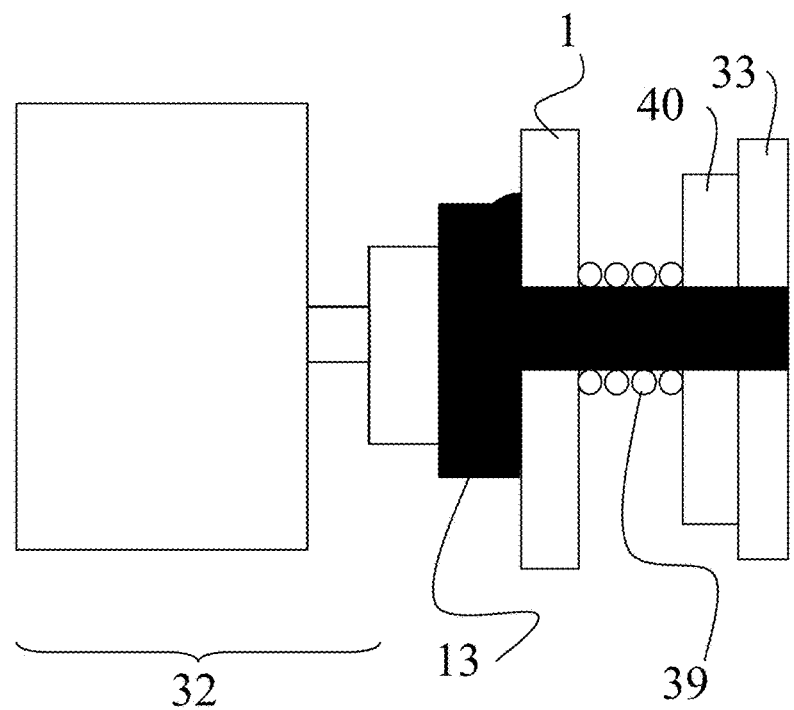
FIG. 4 is an explanatory view of a portion for tilting the projection lens.
Figure 5A:
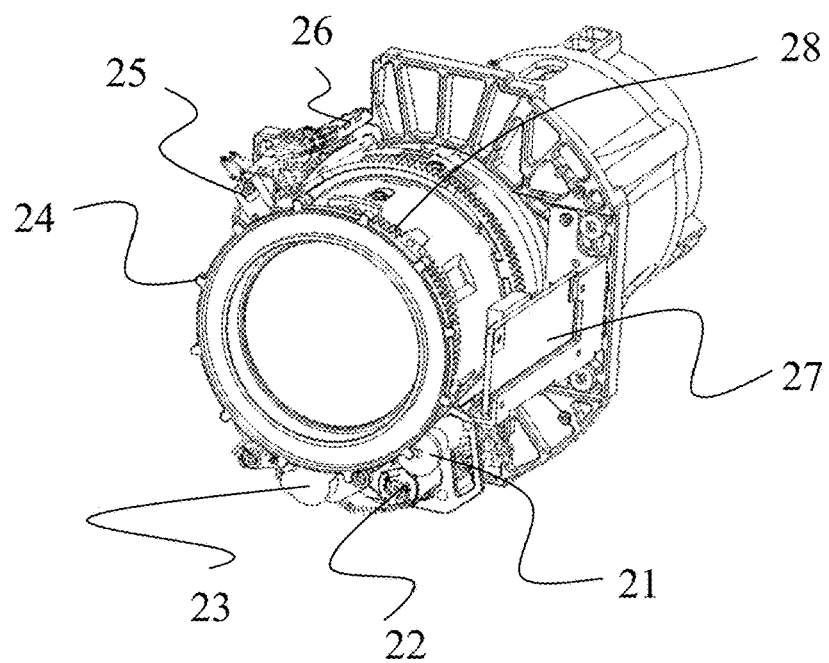
FIGS. 5A to 5C are external views of the projection lens.
Figure 5B:
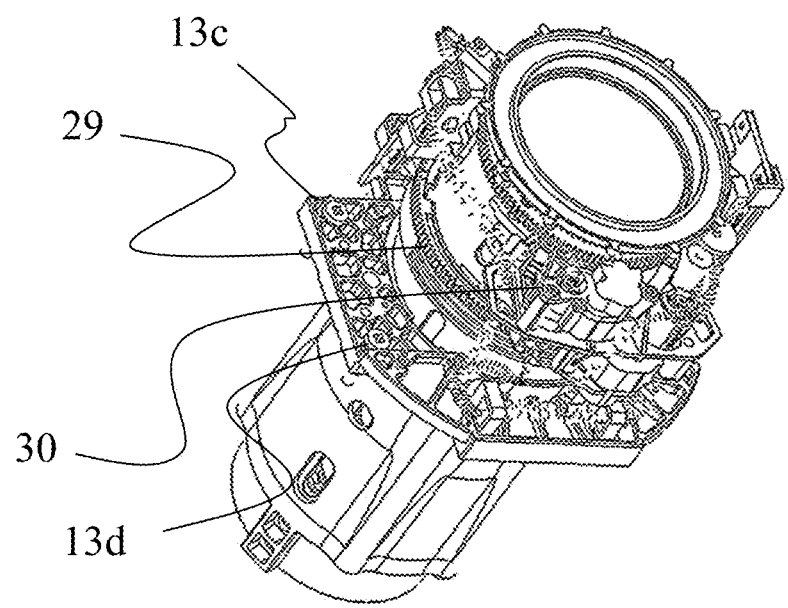
Figure 5C:
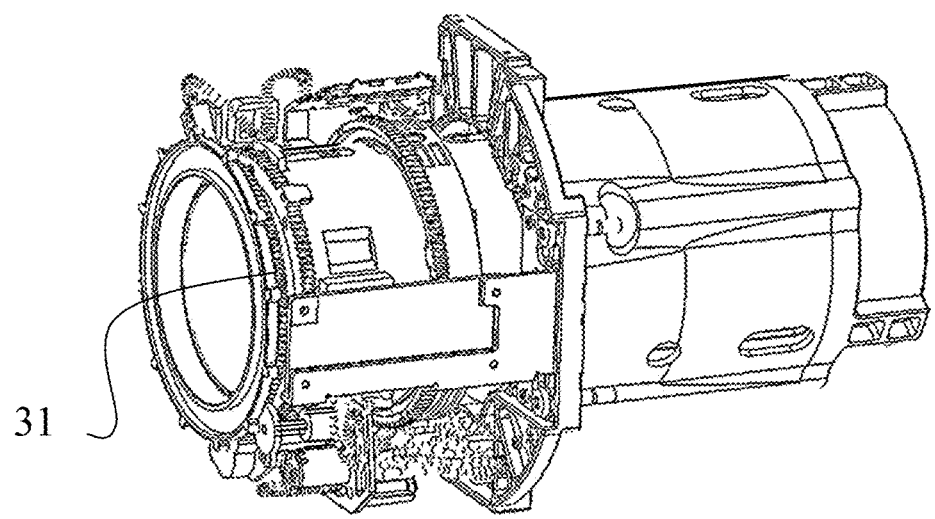
Figure 6:
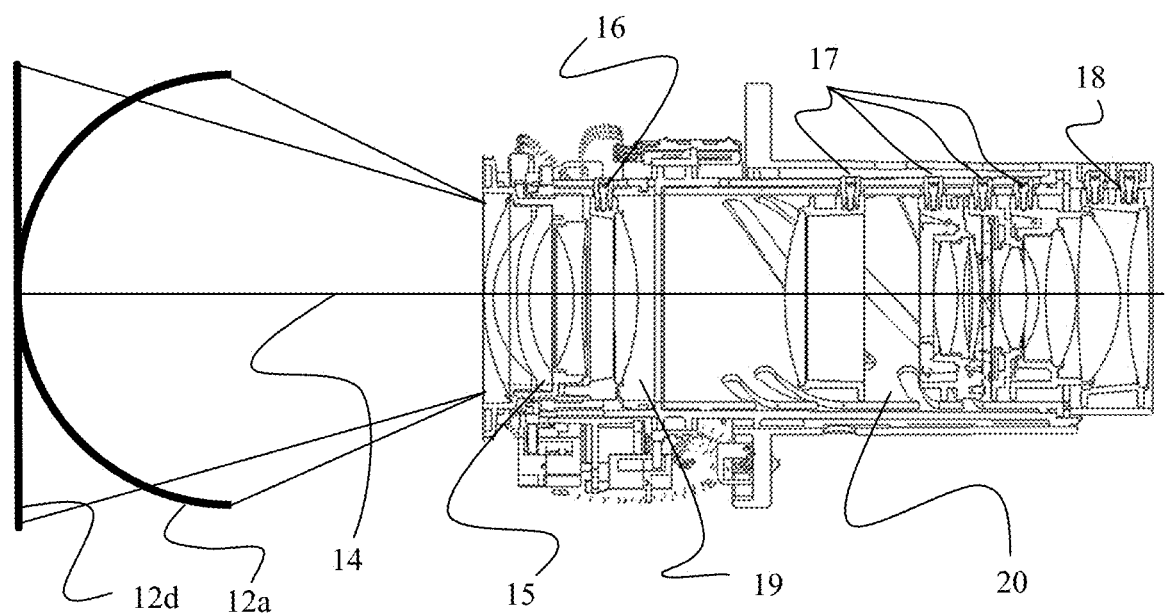
FIG. 6 is a sectional view of the projection lens.

FIG. 4 is an explanatory view of a portion for tilting the projection lens 1. The projection lens 1 is fastened to a lens mount 40 of the shift unit 2 by the lens tilting pin 13. A spring 39 is incorporated between the projection lens 1 and the lens mount 40, and biases them in a direction away from each other. By driving a lens tilting pin motor 32, a distance between the projection lens 1 and the lens mounting portion 40 can be changed. The lens tilting pin motor 32 has a built-in sensor that detects a retracting amount of the lens tilt pin 13.

A color combining unit 5 holds a combining prism 3 and the image generator 4, and is fixed onto the shift unit 2. The image generator 4 is, for example, a micro mirror device, a liquid crystal panel, or the like.

FIGS. 5A to 5C and 6 are external views and a sectional view of the projection lens 1, respectively. When a field curvature adjusting grip 24 rotates, a field curvature adjuster (adjusting unit) 15 moves along an optical axis 14 of the projection lens 1. A field curvature amount of the focal plane changes as the field curvature adjuster 15 moves along the optical axis 14. By setting a focal plane 12d to a focal plane 12a, fitting of a spherical projection target becomes available. A field curvature adjuster position detecting gear 31 moves integrally with the field curvature adjuster 15 along the optical axis 14 and rotates a field curvature adjuster position detecting sensor 21. Thereby, the field curvature adjuster position detecting sensor 21 can detect the position of the field curvature adjuster 15. In this embodiment, the field curvature adjuster 15 is moved according to a manual operation, but it may be moved by an electric driving force.

A focusing cam ring 19 moves a focusing unit 16 along the optical axis 14 using a driving force of a focusing motor 23 given via a focus driving gear 28. As the focusing unit 16 moves along the optical axis, the focus position changes. An initial position detecting sensor 25 detects an initial position of the focusing unit 16. The position detecting sensor 30 includes a photo-interrupter and detects the position of the focusing unit 16 relative to the initial position of the focusing unit 16 detected by the initial position detecting sensor 25.

Figure 7A:
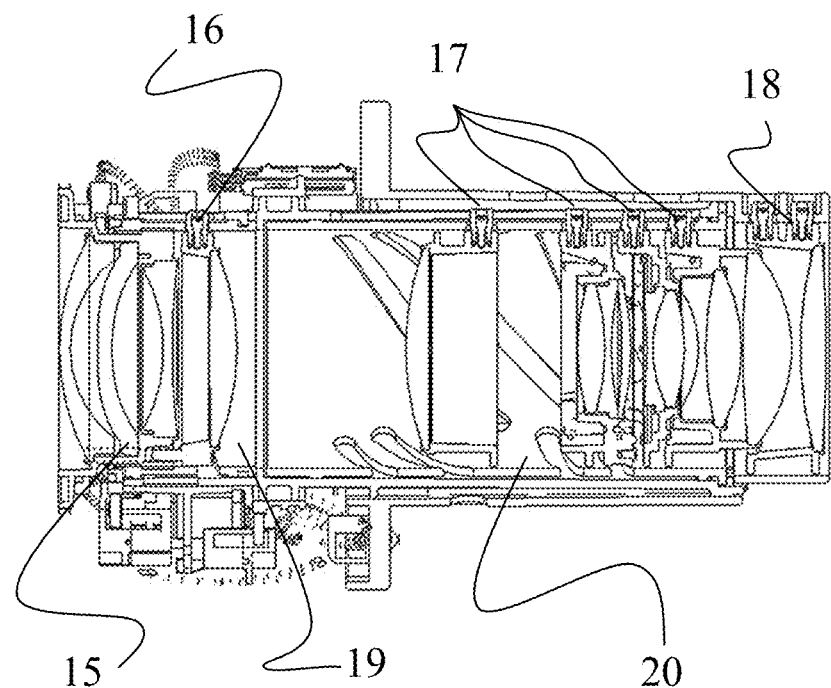
FIGS. 7A and 7B are sectional views of the projection lens.
Figure 7B:
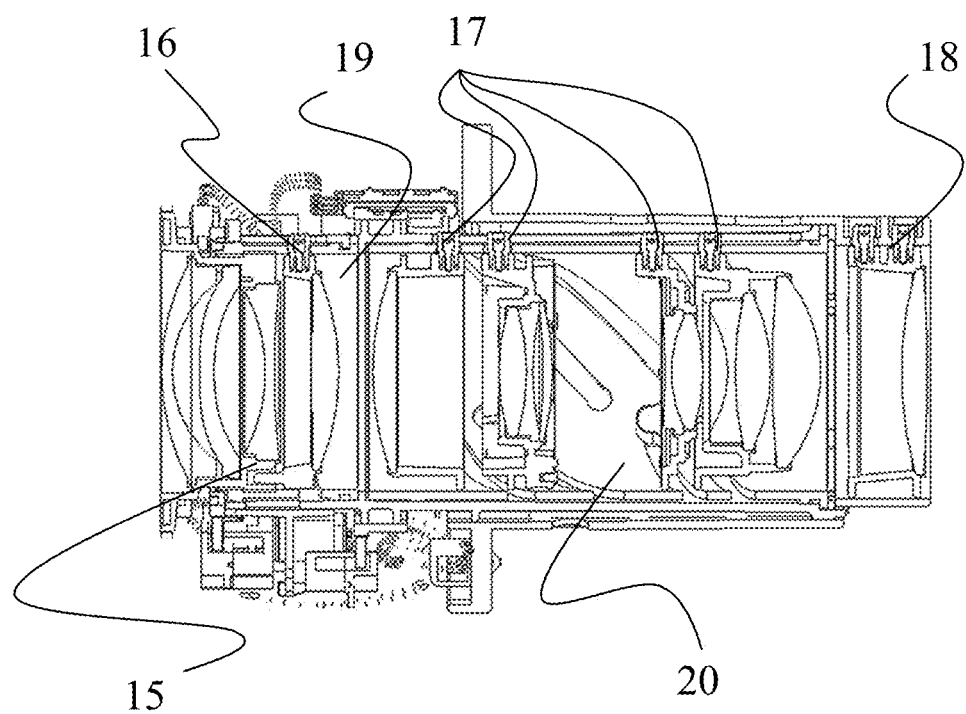

A zooming cam ring 20 moves a zooming unit 17 along the optical axis 14 using a driving force of a zooming motor 22 given via a zoom driving gear 29. A projection magnification varies as the zooming unit 17 moves along the optical axis 14. FIGS. 7A and 7B are sectional views of the projection lens 1 when the zoom positions are a wide-angle end (WIDE) and a telephoto end (TELE), respectively. The position detecting sensor 26 detects the position of the zooming unit 17.

A fixed unit 18 does not move. A lens control board 27 stores various information and controls the projection lens 1.

Figure 8:
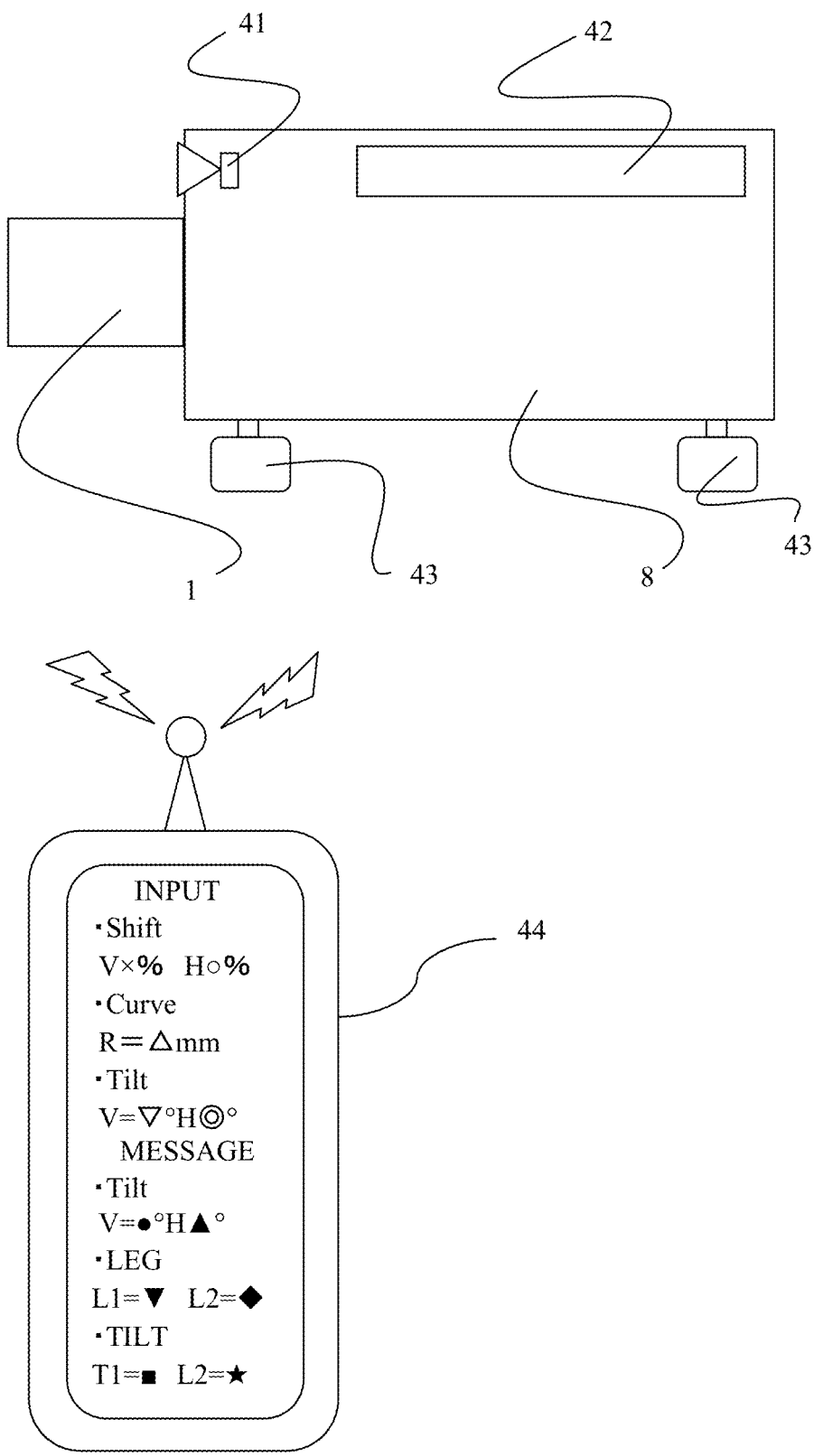
FIG. 8 is a schematic view of the projection type display system.

FIG. 8 is a schematic view of the projection type display system 100. A position information acquirer (acquirer) 41 acquires position information (distance information) of the projection type display apparatus 8 and the projection target. Tilt adjusting feet 43 is provided at the bottom of the projection type display apparatus 8 and contacts an installation surface. An installation angle of the projection type display apparatus 8 is adjustable by rotating each tilt adjusting foot 43. A main board (control task or unit) 42 stores various information and is electrically connected to the projection lens 1, the shift unit 2, and each component of the projection type display apparatus 8 to control each component. The main substrate 42 is configured to communicate with an information communicator 44 which is an external input unit. The information communicator 44 can input information to the projection type display apparatus 8 by the user, and receive information from the projection type display apparatus 8. The information communicator 44 can be used as the position information acquirer 41 if, for example, the distance between the projection lens 1 and the projection type display apparatus 8 etc. can be directly input.

While the position information acquirer 41 is provided inside the projection type display apparatus 8 in this embodiment, it may be configured separately from the projection type display apparatus 8. While the information communicator 44 is configured separately from the projection type display apparatus 8 in this embodiment, it may be provided inside the projection type display apparatus 8.

Figure 9:
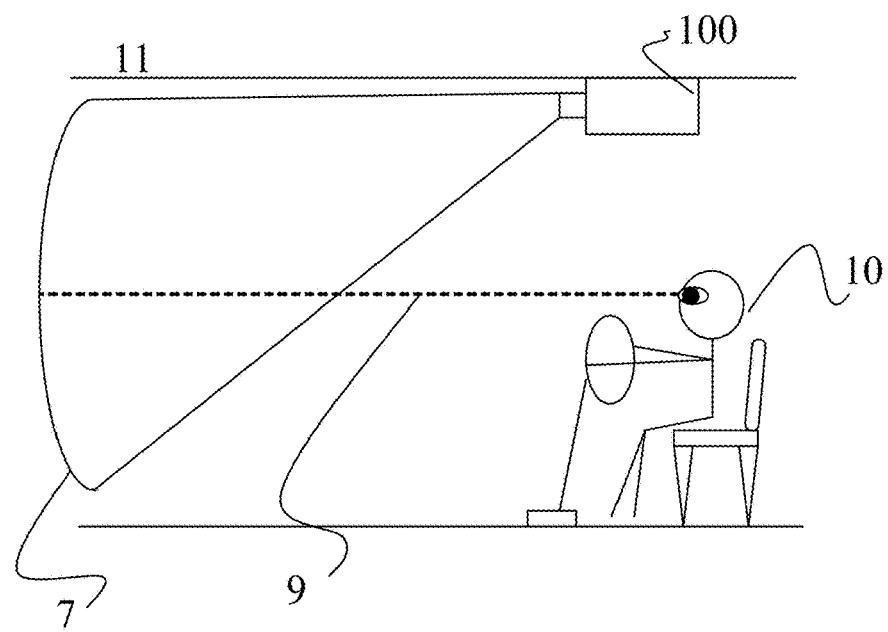
FIG. 9 illustrates an illustrative driving simulator.

FIG. 9 illustrates an illustrative driving simulator 11. In the driving simulator 11, a projection image is projected onto a curved projection target 7 by the plurality of projection type display systems 100, and changed when a driving operation of an operator 10 is detected. Then, for example, the entire machine on which the operator 10 sits tilts or vibrates. In the driving simulator 11, for example, the projection target 7 is disposed so that the center accords with a visual line 9. The projection type display system 100 may be installed on the visual line 9 of the operator 10, but is usually installed in a state where the visual line 9 and the optical axis of the projection lens 1 shift from each other. In this case, the focal plane that is moved in the direction orthogonal to the optical axis while intentionally causing a field curvature cannot be accurately fitted for the projection target 7. Accordingly, this embodiment tilts the projection lens 1 to provide accurate fitting to the projection target 7.

Figures 10A, 10B, 10C, 10D:
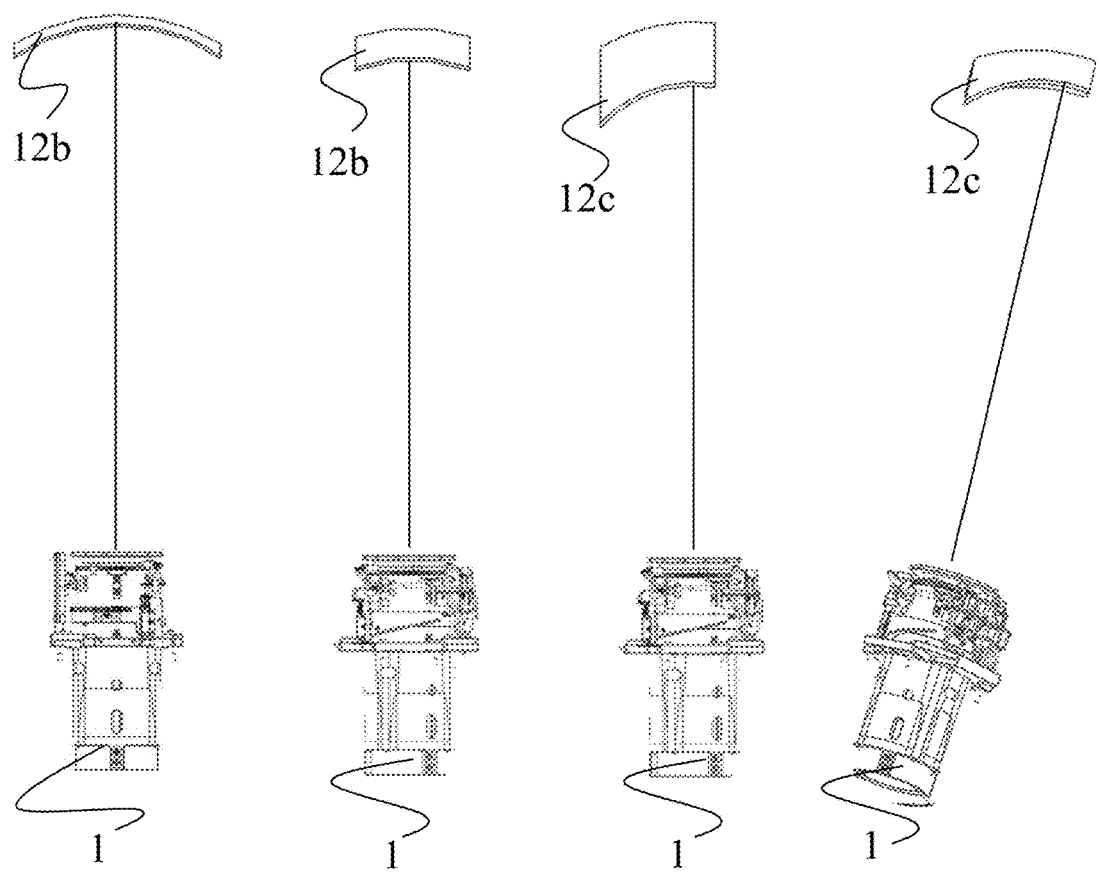
FIGS. 10A to 10D illustrates a relationship between the projection lens and a focal plane.

FIGS. 10A to 10D and 11A to 11C illustrate a relationship between the projection lens 1 and the focal plane 12 of the projection lens 1. FIG. 11A illustrates that the projection lens 1 intentionally causes a field curvature and a focal plane is a curved focal plane 12a. FIG. 10A illustrates a focal plane 12b in the area cut out by the image generator 4 in the focal plane 12a of the projection lens 1. At this time, the shift unit 2 does not move the projection lens 1 on the plane orthogonal to the optical axis. The driving simulator 11 includes a plurality of projection type display systems 100 arranged for the horizontally long projection target 7. In this case, the projection type display apparatus 8 is often disposed while it is rotated by about 90 degrees around the optical axis of the projection lens 1 so that the long side of the projection image corresponds to the short side of the projection target 7. FIGS. 10B and 11B illustrate the focal plane 12b after the projection lens 1 is rotated by 90 degrees from the state of FIG. 10A to the center of the optical axis of the projection lens 1. FIGS. 10C and 11C illustrate a focal plane 12c where the projection lens 1 intentionally causes the field curvature, and the projection lens 1 is moved in a direction orthogonal to the optical axis by the shift unit 2 from the state of FIGS. 10B and 11B. Then, since a portion different from FIGS. 10B and 11B is cut out of the focal plane 12a, the focal plane 12c is different from the focal plane 12b. FIG. 10D illustrates the focal plane 12c when the projection lens 1 is tilted from the state of FIG. 10C. Even when the projection lens 1 is moved in the direction orthogonal to the optical axis while intentionally causing a field curvature in the projection lens 1, this embodiment can make the focal plane 12c equal to the focal plane 12b by tilting the projection lens 1.

First Embodiment

Figure 12:
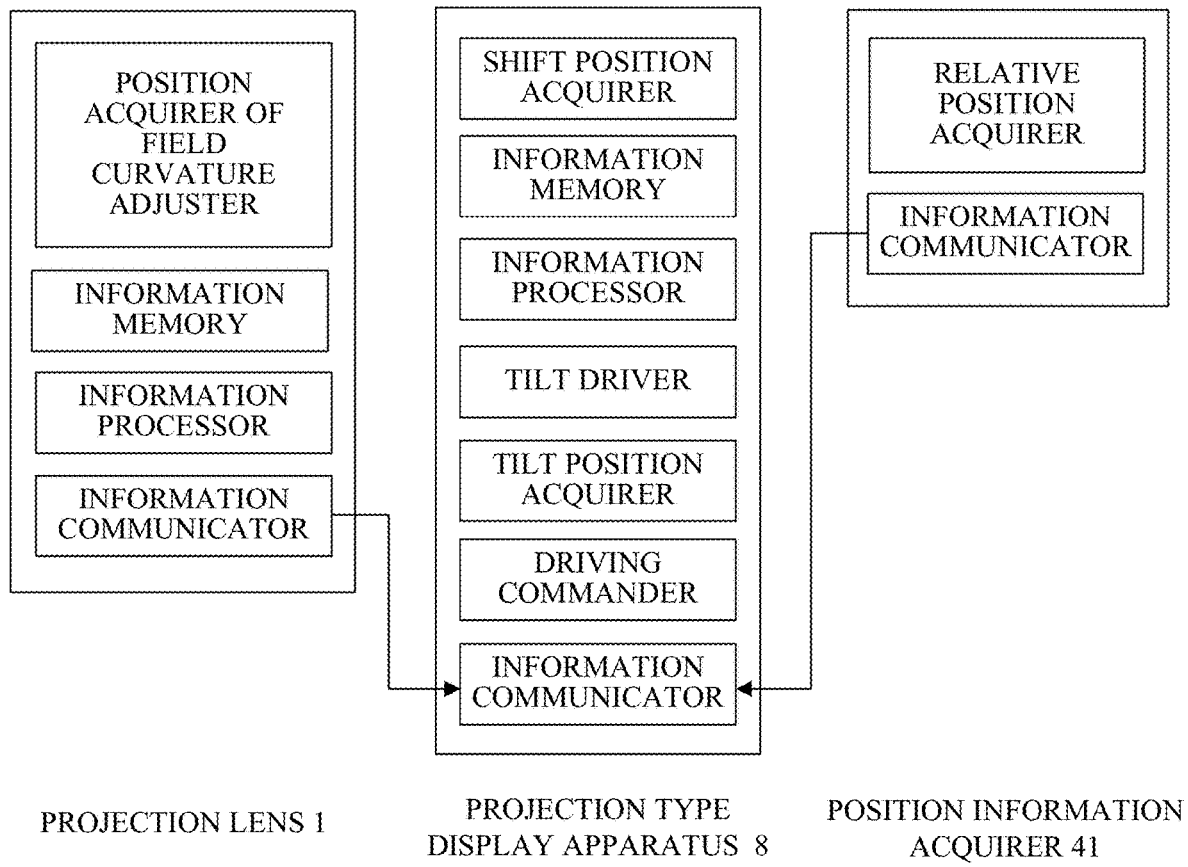
FIG. 12 is a block diagram of a projection type display system according to a first embodiment.

FIG. 12 is a block diagram of the projection type display system 100 according to this embodiment. The projection type display system 100 includes the projection lens 1, the projection type display apparatus 8 to which the projection lens 1 is detachably attachable, and the position information acquirer 41 that acquires position information of the projection type display apparatus 8 and the projection target.

Figure 13:
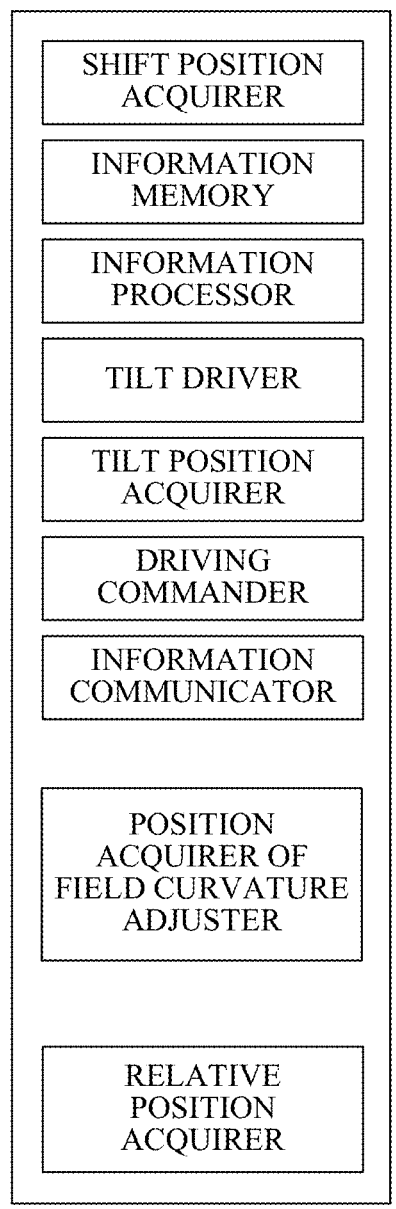
FIG. 13 is a block diagram of a projection type display system when the projection lens and a position information acquirer according to the first embodiment are integrated with the projection type display apparatus.

The projection lens 1 and the position information acquirer 41 may be integrated with the projection type display apparatus 8. FIG. 13 is a block diagram of the projection type display system 100 when the projection lens 1 and the position information acquirer 41 are integrated with the projection type display apparatus 8.

The projection lens 1 includes a position acquirer of the field curvature adjuster 15, an information memory (storage unit), an information processor, and an information communicator, and can adjust the field curvature of the focal plane. The position acquirer of the field curvature adjuster 15 includes the field curvature adjuster position detecting sensor 21, and detects the position of the field curvature adjuster 15. The information memory, the information processor, and the information communicator are provided in the lens control board 27. The information memory stores information for acquiring the state of the focal plane 12 of the projection image using the information from the position acquirer of the field curvature adjuster 15. For example, it is information for converting information from the position acquirer of the field curvature adjuster 15 into information on the field curvature amount. The information processor acquires the state of the focal plane 12 of the projection image using the information from the position acquirer of the field curvature adjuster 15 and the information stored in the information memory. The information communicator transmits the information acquired by the information processor to the main board 42, which is the information communicator of the projection type display apparatus 8.

The position information acquirer 41 includes a relative position acquirer and an information communicator. The relative position acquirer includes an imager, an information input unit, and the like, and acquires position information of the projection type display apparatus 8 and the projection target.

One specific example is a relative position acquiring method using a random dot pattern. This method projects a pattern in which points are randomly arranged through a projector that is a projection type display apparatus, and acquires the projection image by a camera that is an imager. At this time, it is assumed that the positional relationship between the projection optical axis of the projector and the imaging optical axis of the camera is recognized in advance. By matching the projection image with the acquired image (due to differences in point shape, position, etc.), the relative positional relationship between the projection type display apparatus and the screen (including a curved screen shape) that is a projection target can be obtained. For example, an actually captured image is compared with an image that would be obtained when projected onto a plane, and the relative positional relationship is obtained from the comparison of these images. This is merely illustrative, and the acquiring method is not limited as long as it can acquire the relative position.

The projection type display apparatus 8 has a shift position acquirer, an information memory, an information processor, a tilt driver, a tilt position acquirer, a driving commander, and an information communicator. The information memory, information processor, driving commander, and information communicator are configured in the main board 42.

The shift position acquirer includes a Z-direction position detecting sensor 35 and a Y-direction position detecting sensor 38 in the shift unit 2. The shift position acquirer acquires shift position information that is a shift amount between the optical axis 6 of the image generator 4 (optical axis incident on the projection lens 1, predetermined position in the imaging area of the image generator 4) and the optical axis of the projection lens 1. In this embodiment, the shift amount is a moving amount of the shift unit 2 relative to the optical axis of the projection lens 1. The predetermined position in the imaging area of the image generator 4 is, for example, a center position of the imaging area. The center position does not have to be the exact center of the imaging area, and includes a position near the center which is considered to be substantially the center. This embodiment movably holds the projection lens 1 in a plane orthogonal to the optical axis, but the projection lens 1 may be integrated with the projection type display apparatus 8 or may be held immovably in a plane orthogonal to the optical axis. Even in that case, the shift position acquirer acquires the shift amount between the optical axis of the image generator 4 and the optical axis of the projection lens 1 in a state where the projection lens 1 is fixed to the projection type display apparatus 8. The shift amount may be stored in advance in the information memory, and the shift position acquirer may read the stored shift amount when necessary.

The information memory stores information to be converted from shift position information to a shift position. The information memory stores information for converting the information from the relative position acquirer into numerical information that defines the shape of the projection target and the relative positional relationship between the projection type display apparatus 8 and the projection target. The information memory stores information for acquiring a tilt adjusting amount of the projection lens 1 from the field curvature amount adjusted by the projection lens 1 and the shift position information from the shift position acquirer. The information memory stores information for converting the acquired tilt adjusting amount into a driving command value.

The information processor converts the shift position information into the shift position using the information from the information memory. For example, the information processor converts the sensor values of the Z-direction position detecting sensor 35 and the Y-direction position detecting sensor 38 into values such as Z % in the upper direction and Y % in the right direction. The information processor converts the information from the relative position acquirer into numerical information that defines the shape of the projection target and the relative positional relationship between the projection type display apparatus 8 and the projection target, using the information from the information memory. For example, the information processor converts the relative distance into ×1 (mm), the projection position into ×2 mm below the optical axis of the projection lens 1, and the field curvature amount into ×3 mm. The information processor acquires, for example, ×4° in the left direction, ×5° in the downward direction, and the like for the tilt adjusting amount. The information processor converts the acquired tilt adjusting amount into a driving command value. The driving command value is, for example, a command value for a sensor disposed in the lens tilting pin motor 32 that drives the lens tilting pin 13 configured to change the tilt adjusting amount of the projection lens 1.

The tilt driver includes a lens tilting pin motor 32. The tilt position acquirer includes a sensor disposed in the lens tilting pin motor 32.

Figure 14:
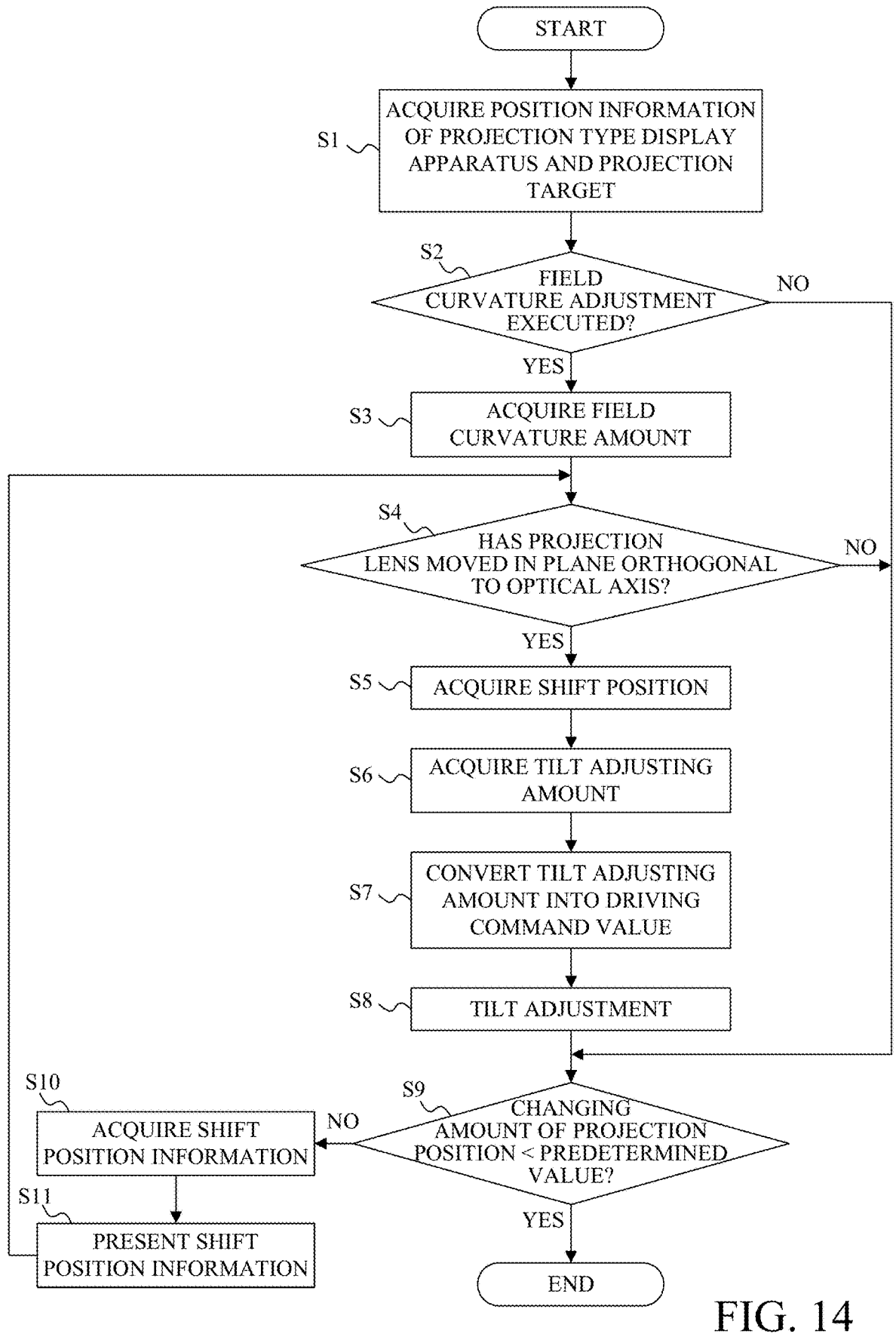
FIG. 14 is a flowchart showing a control method of the projection type display system according to the first embodiment.

Referring now to FIG. 14, a description will be given of a control method of the projection type display system 100 according to this embodiment. FIG. 14 is a flowchart showing a control method of the projection type display system 100 according to this embodiment.

In the step S1, the information processor in the main board 42 acquires the position information of the projection type display apparatus 8 and the projection target, which is the information on the projection target acquired from the relative position acquirer. The position information of the projection type display apparatus 8 and the projection target may be acquired by the relative position acquirer configured to be the imager, or the user inputs the position information to the relative position acquirer via the information communicator 44.

In the step S2, the information processor in the main board 42 determines whether to perform a field curvature adjustment. For example, regarding the acquired curvature of the curved screen, the information processor can determine whether to perform the field curvature adjustment by comparing the position of the field curvature adjuster 15 acquired from the current projection lens 1 with the position of the field curvature adjuster 15 when the focal plane 12 stored in the information memory is flat and no field curvature adjustment is made. For example, if the difference between the acquired curvature of the curved screen that is the projection target and a curvature amount of the optical projection surface generated by the projection lens 1 is equal to or greater than a predetermined amount, an adjustment will be made. If the field curvature adjustment is made, the flow proceeds to the step S3, and if the field curvature adjustment is not made, the flow proceeds to the step S9.

In the step S3, the information processor in the main board 42 acquires the state of the focal plane 12 (field curvature amount) calculated by the information processor in the lens control board 27 using the position of the field curvature adjuster 15. This is an adjustment completed state, for example, in which a difference between the curvature of the curved screen that is the projection target and has been acquired by the previously described method, and the curvature amount of the optical projection surface generated by the projection lens 1 by changing the position of the field curvature adjuster 15 becomes a predetermined amount or less. When the projection lens 1 is integrated with the projection type display apparatus 8 as illustrated in FIG. 13, the information processor on the main board 42 may calculate the field curvature amount.

In the step S4, the information processor in the main board 42 determines whether the projection lens 1 moves in a plane orthogonal to the optical axis (whether the optical axis of the image generator 4 and the optical axis of the projection lens 1 are to shift from each other). For example, it makes a determination based on the acquired center position of the curved screen and a shift amount in the plane direction orthogonal to the projection direction of the projection type display apparatus. For example, whether the projection lens 1 moves can be determined by comparing the shift position information acquired from the shift position acquirer with the shift position information stored in the information memory when the projection lens 1 does not move. That is, it is determined based on whether a difference between the shift amount generated by the projection type display apparatus and an acquired shift amount is equal to or less than a predetermined amount. The movement is not always necessary and, for example, even when there is no shift unit 2 and the projection lens 1 is fixed, a shift amount between the optical axis of the image generator 4 and the optical axis of the projection lens 1 may be equal to or less than a predetermined amount for the acquired shift amount. When the projection lens 1 moves (when the shift amount between the optical axis of the image generator 4 and the optical axis of the projection lens 1 is not zero), the flow proceeds to the step S5, and when the projection lens 1 does not move (when the shift amount between the optical axis of the image generator 4 and the optical axis of the projection lens 1 is zero), the flow proceeds to the step S9.

In the step S5, the information processor in the main board 42 acquires the shift position using the shift position information acquired from the shift position acquirer.

In the step S6, the information processor in the main board 42 acquires the tilt adjusting amount using the position information of the projection type display apparatus 8 acquired in the step S1 and the projection target, the field curvature amount acquired in the step S3, and the shift position acquired in the step S5. At this time, the information processor in the main board 42 acquires the tilt adjusting amount so that the focal plane approaches to the focal plane in the state where the projection lens 1 does not move. In order to make the focal plane closer to the focal plane in the state where the projection lens 1 does not move, the tilt adjusting amount may be acquired so as to reduce a difference between the position in the optical axis direction of a predetermined position on the projection target and the position on the focal plane in the optical axis direction of the position corresponding to the predetermined position. The plurality of predetermined positions may be positions of the four corners of the projected image.

For example, when the predetermined positions are the four corners of the projection screen, an adjustment may be made so as to minimize a sum of a difference at a first corner, a difference at a second corner, a difference at a third corner, and a difference at a fourth corner. The method of acquiring (calculating) the tilt amount is not limited to this example, and a specific point may be multiplied by a coefficient to make a difference in importance among a plurality of points. For example, when the predetermined positions include the center of the projection screen and the four corners, an adjustment may be made so as to minimize a sum of a difference at the first corner, a difference at the second corner, a difference at the third corner, a difference at the fourth corner, and 2 times a difference at the screen center. In this case, the difference in the screen center position, which is the center of the viewer's viewpoint, is more important than the four corners.

In the step S7, the information processor in the main board 42 converts the tilt adjusting amount acquired in the step S6 into the driving command value.

In the step S8, the information processor in the main board 42 drives the lens tilting pin motor 32 using the driving command value acquired in the step S7, and performs a tilt adjustment. In this embodiment, the tilt adjustment is made using the lens tilting pin 13, but the tilt adjustment may be made using the tilt adjustment feet 43.

In the step S9, the information processor in the main board 42 determines whether or not a changing amount of the projection position due to the tilt adjustment made in the step S8 is smaller than the predetermined amount. The predetermined value may be set to a changing permissible value of the projection position due to the tilt adjustment. If the changing amount in the projection position is smaller than the predetermined amount, this flow ends, and if the changing amount in the projection position is larger than the predetermined amount, the flow proceeds to the step S10. When the changing amount in the projection position is equal to the predetermined amount, which step to proceed to can be arbitrarily set.

In the step S10, the information processor in the main board 42 acquires the shift position information using the difference amount between the current projection position and the predetermined amount in the step S9.

In the step S11, the information processor in the main board 42 presents the shift position information acquired in the step S10 to the user. Thereafter, the flow returns to the step S4. While the shift position information is presented to the user in this embodiment, an automatic adjustment may be made based on the shift position information.

As described above, the configuration according to this embodiment can easily make a tilt adjustment when the projection lens 1 is moved while adjusting the field curvature.

Second Embodiment

Figure 15:
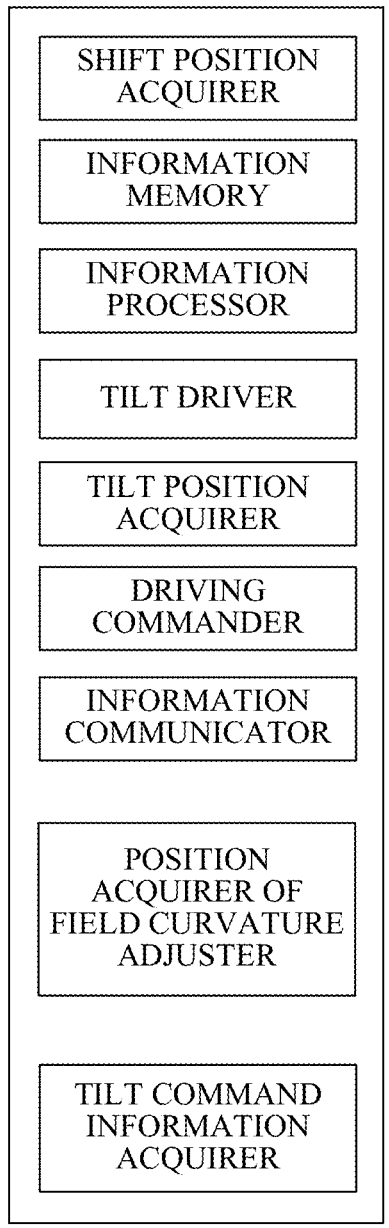
FIG. 15 is a block diagram of a projection type display system according to a second embodiment.

FIG. 15 is a block diagram of the projection type display system 100 according to this embodiment. The projection type display system 100 includes the projection lens 1 and the projection type display apparatus 8 including a tilt command information acquirer corresponding to the information communicator 44 in FIG. 8. The projection lens 1 may be interchangeable with the projection type display apparatus 8. The tilt command information acquirer may be separate from the projection type display apparatus 8.

The tilt command information acquirer when built in the projection type display apparatus 8 includes a liquid crystal screen and operation buttons. When the tilt command information acquirer is configured separately from the projection type display apparatus 8, it includes a remote control type terminal. In any case, the tilt command information acquirer may be configured to be able to input information.

Figure 16:
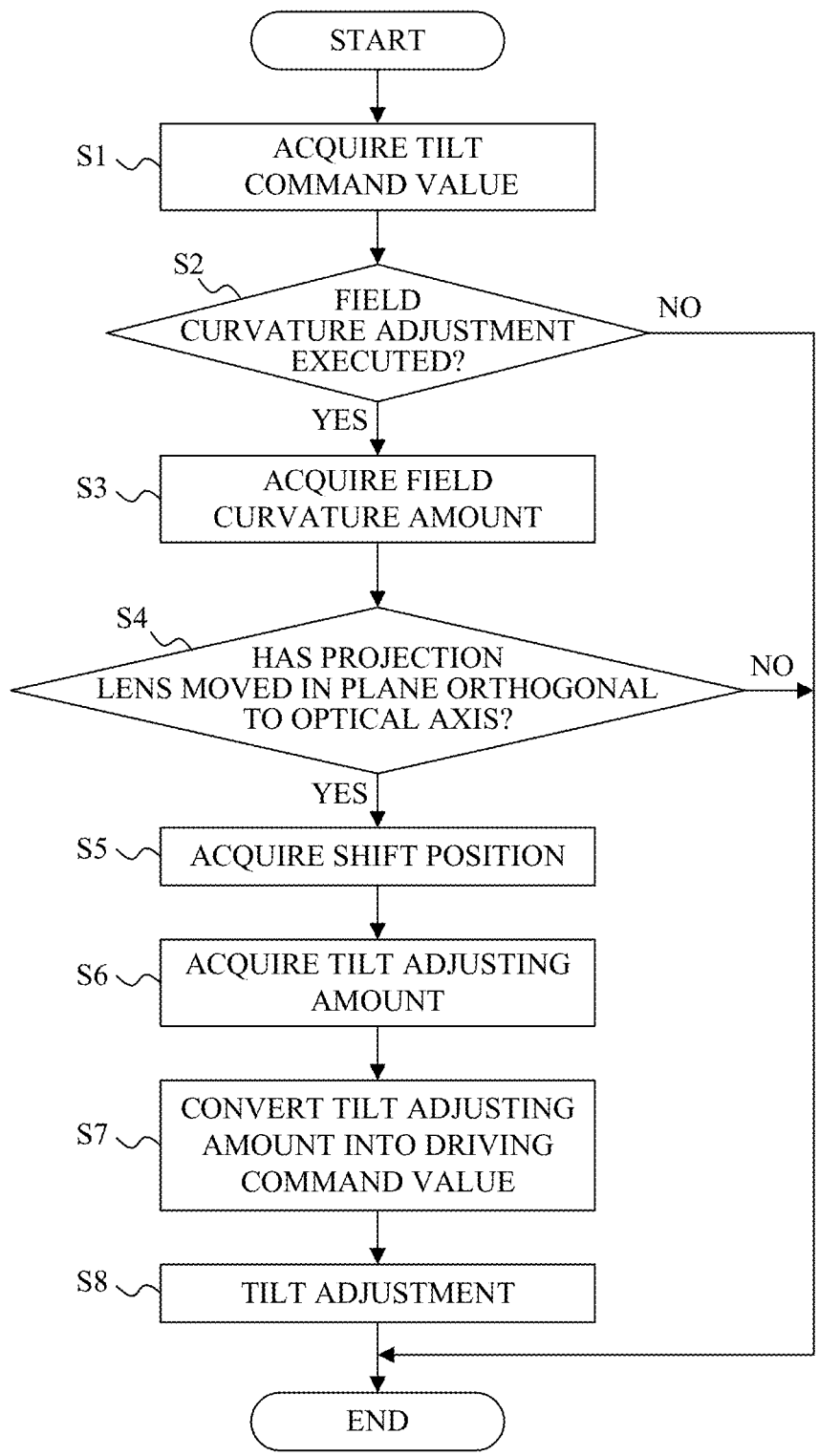
FIG. 16 is a flowchart showing a control method of the projection type display system according to the second embodiment.

Referring now to FIG. 16, a description will be given of a control method of the projection type display system 100 according to this embodiment. FIG. 16 is a flowchart showing the control method of the projection type display system 100 according to this embodiment. This flow starts after an installation of the projection type display system 100 for the projection target is roughly completed.

In the step S1, the information processor acquires a tilt command value of the projection lens 1, which is information on the projection target, via the tilt command information acquirer. For example, the tilt amount of the projected image is acquired.

Since processing from the step S2 to the step S5 is the same as that in the first embodiment, a description thereof will be omitted.

In the step S6, the information processor acquires the tilt adjusting amount to bring the focal plane closer to the focus plane in a state where the projection lens 1 does not move, using the tilt command value acquired in the step S1, the field curvature amount acquired in the step S3, and the shift position acquired in the step S5. The tilt amount is acquired similarly to the step S6 in the first embodiment, but the predetermined amount is the command amount acquired in the step S1, and this is used as a determination criterion. That is, it is possible to designate the coincidence degree of the focal plane with the projection target.

Since processing in the steps S7 and S8 is the same as that of the first embodiment, a description thereof will be omitted.

Although processing in the steps S9 to S11 in the first embodiment is not performed in this embodiment, they may be performed.

As described above, the configuration according to this embodiment can easily make a tilt adjustment when the projection lens 1 is moved while adjusting a field curvature.

Third Embodiment

The configuration of the projection type display system according to this embodiment is the same as that of the projection type display system 100 according to the second embodiment.

Figure 17:
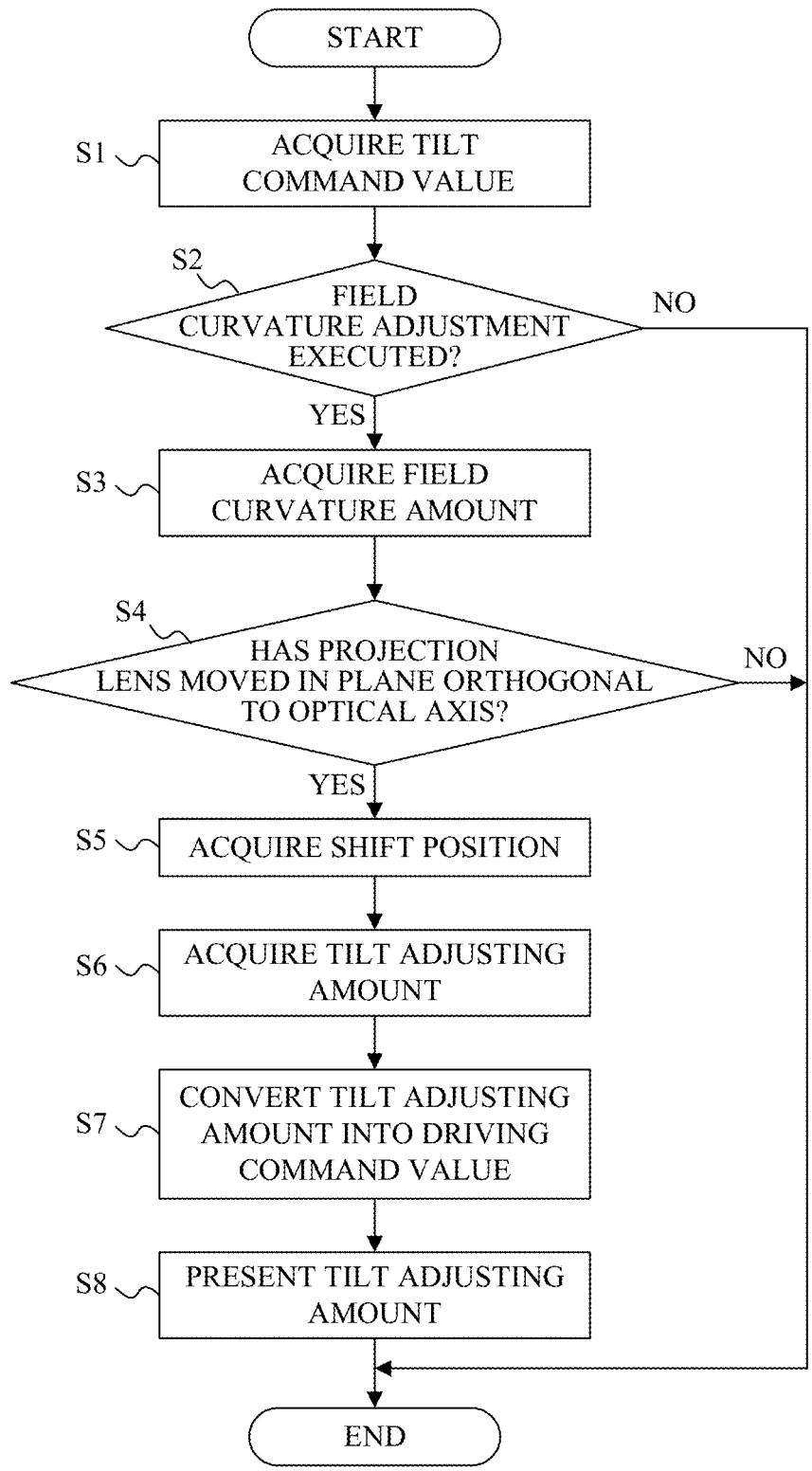
FIG. 17 is a flowchart showing a control method of a projection type display system according to a third embodiment.

Referring now to FIG. 17, a description will be given of a control method of the projection type display system according to this embodiment. FIG. 17 is a flowchart showing a control method of the projection type display system according to this embodiment. This flow starts after an installation of the projection type display system for the projection target is roughly completed.

Since processing from the step S1 to the step S6 is the same as that in the second embodiment, a description thereof will be omitted.

In the step S7, the information processor converts the tilt adjusting amount of the projection lens 1 acquired in the step S6 into a driving command value. The driving command value defines a driving condition of a tilt adjuster for the projection lens 1. When the lens tilting pin motor 32 is operated by the operation unit, the driving command value is the number of pushes of the operation button. When the tilt adjusting feet 43 in the projection type display apparatus are adjusted with screws, the driving command value is the number of rotations of the screw. Even when the projection type display system is mounted on the ceiling and used, the adjusting amount of the tilt adjuster corresponding to the tilt adjusting amount may be set to the driving command value.

In the step S8, the information processor presents the driving command value converted in the step S7. The information processor may present the driving command value on the projection surface, or may present it on the screen configured in the projection type display system or the information communicator 44. This step presents the command value, but may present any information on the tilt adjusting amount or the tilt adjusting amount.

Similar to the second embodiment, this embodiment does not perform processing in the steps S9 to S11 in the first embodiment, but may perform it.

As described above, the configuration according to this embodiment can easily perform a tilt adjustment when the projection lens 1 is moved while adjusting a field curvature.

Fourth Embodiment

Figure 18:
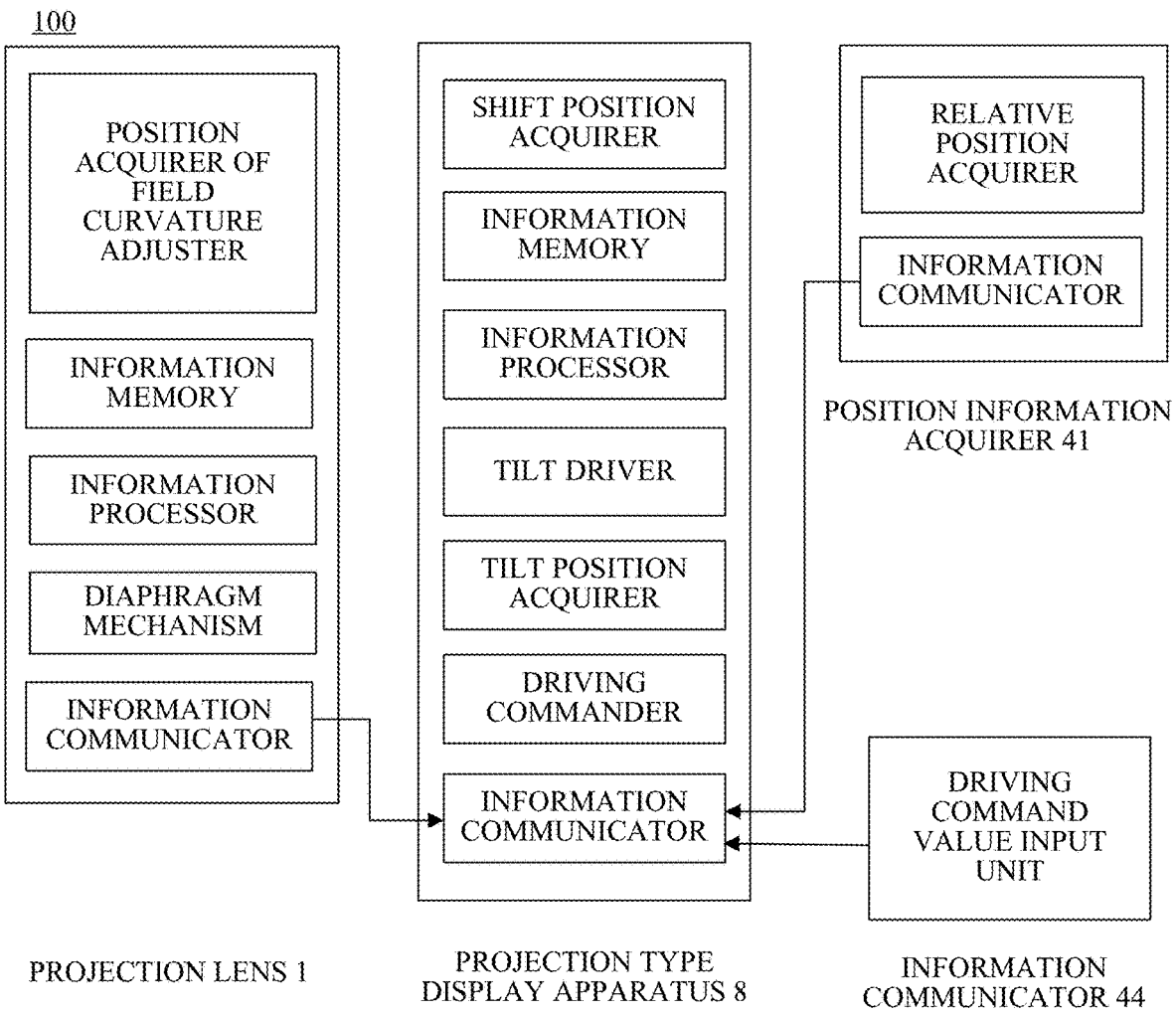
FIG. 18 is a block diagram of a projection type display system according to a fourth embodiment.

FIG. 18 is a block diagram of the projection type display system 100 according to this embodiment. The projection type display system 100 includes an information communicator 44 including a driving command value input unit in addition to the configuration of the projection type display system 100 according to the first embodiment. The information communicator 44 deals with various inputs and outputs. For example, it can input a shift amount, a field curvature adjusting amount, a tilt adjusting amount, etc. calculated in advance from the projection target and the installation position of the projection type display apparatus 8. It may present (output) a driving command value. In the projection type display system according to this embodiment, the projection lens 1, the position information acquirer 41, and the information communicator 44 are each configured as a separate member from the projection type display apparatus 8, but may be integrated with it.

The projection lens 1 includes a diaphragm mechanism (diaphragm or aperture stop unit) that can be opened and closed in addition to the configuration described in the first embodiment. The diaphragm mechanism can adjust a passing light amount through an opening level. The information memory in the lens control board 27 stores design information of the projection lens 1. The design information may be any information necessary to calculate the depth of field. For example, in order to calculate the depth of field information corresponding to the image height to be used (information on the shift position) and pixel size information of the liquid crystal panel or the micro mirror device in the projection type display apparatus 8. When the projection lens 1 is configured interchangeably with the projection type display apparatus 8, the design information includes type information and optical design information of the projection lens 1. The information memory in the lens control board 27 or the main board 42 stores the relationship between the depth of field and the opening level of the diaphragm mechanism. The smaller the aperture diameter in the diaphragm mechanism is, the darker the projection image becomes, but the deeper (wider) the depth of field becomes.

Figure 19:
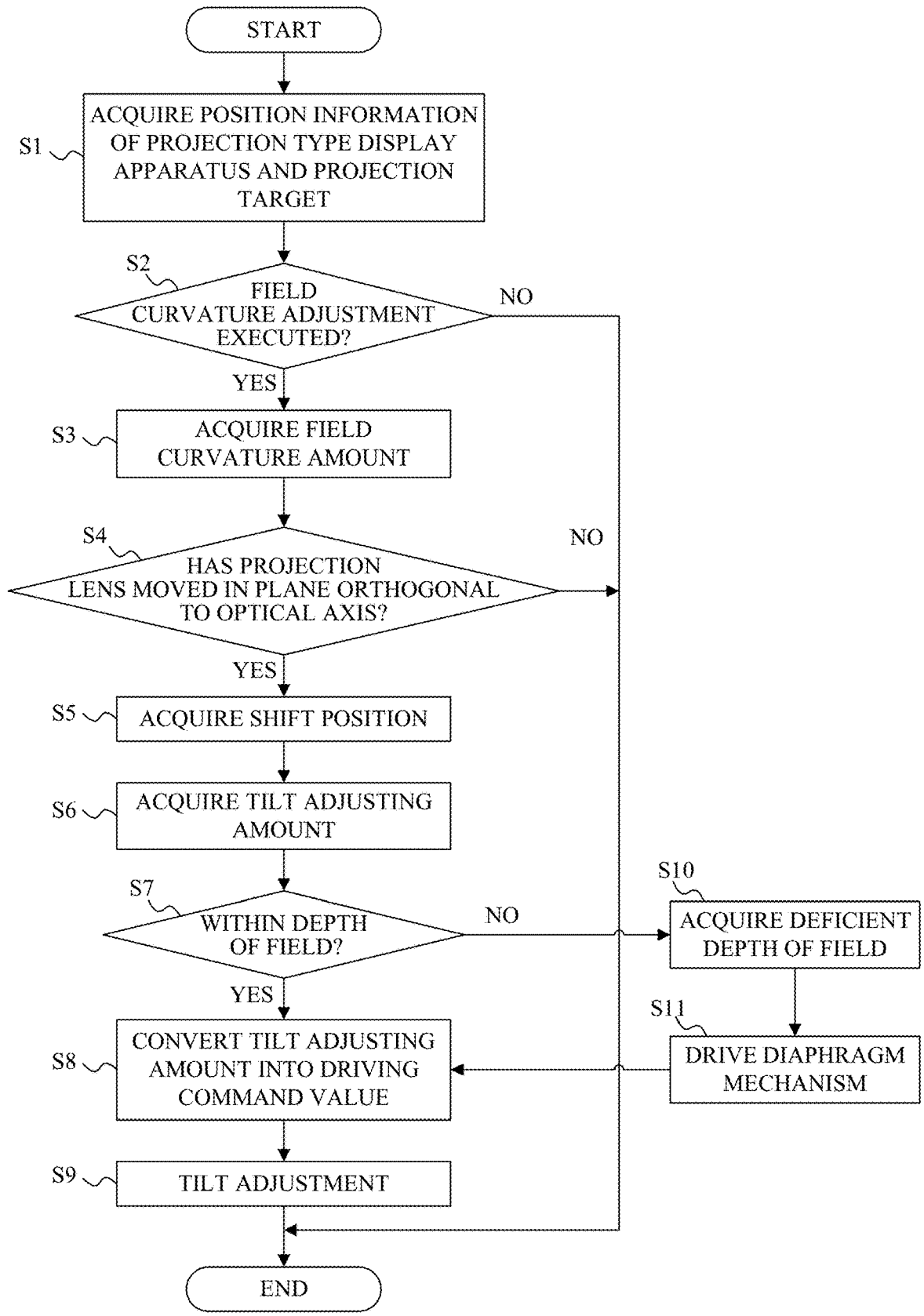
FIG. 19 is a flowchart showing a control method of the projection type display system according to the fourth embodiment.

Referring now to FIG. 19, a description will be given of a control method of the projection type display system 100 according to this embodiment. FIG. 19 is a flowchart showing the control method of the projection type display system according to this embodiment. This flow starts after the installation of the projection type display system for the projection target is roughly completed.

Since processing from the step S1 to the step S6 is the same as that in the first embodiment, a description thereof will be omitted.

In the step S7, the information processor in the main board 42 determines whether or not the tilt adjusting amount is within the depth of field. This embodiment determines whether the tilt adjusting amount is within the depth of field, based on determining whether the tilt adjusting amount is larger than the maximum adjusting amount for the tilt adjuster. For example, assume that the tilt amount is defined as a slope of a line that passes two points on the closest side and the farthest side of the projection type display system 100 in the optical axis direction. Then, the depth of field is defined as a distance in the optical axis direction between the closest side and the farthest side. In this case, when a difference between the distance in the optical axis direction of the tilt adjusting amount and the distance in the optical axis direction of the maximum adjusting amount is larger than a depth of field, the tilt adjusting amount is within the depth of field. If the tilt adjusting amount is within the depth of field, the flow proceeds to the step S8, and if the tilt adjusting amount is outside the depth of field, the flow proceeds to the step S10.

Since processing of the steps S8 and S9 correspond to that of the steps S7 and S8 in the first embodiment, respectively, a description thereof will be omitted.

In the step S10, the information processor in the main board 42 acquires the deficient depth of field.

In the step S11, the information processor in the main board 42 opens and closes the diaphragm mechanism according to the depth of field acquired in the step S10.

As described above, the configuration of this embodiment can easily make a tilt adjustment when the projection lens 1 is moved while adjusting a field curvature.

Each of the above embodiments can provide a projection type display apparatus, a projection type display system, a control method of the projection type display apparatus, and a storage medium, each of which can easily make a tilt adjustment when the projection optical system is moved while adjusting the field curvature.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-211088, filed on Nov. 22, 2019 and 2020-178992, filed on Oct. 26, 2020 which are hereby incorporated by reference herein in their entirety.

What is claimed is:

1. A projection type display apparatus which includes an optical system having an adjuster configured to adjust a field curvature of an in-focus plane of a projection image, the projection type display apparatus comprising:
   at least one processor or circuit configured to execute a plurality of tasks including:
   an acquisition task configured to acquire position information of a predetermined position in an imaging area of an image generator and an optical axis of the optical system; and
   a control task configured to acquire an adjusting amount of a tilt unit configured to tilt the in-focus plane, using information from the acquisition task, a field curvature amount of the in-focus plane based on a position of the adjuster, and information on a projection target.

2. The projection type display apparatus according to claim 1, wherein in the imaging area, the predetermined position shifts from the optical axis of the optical system.

3. The projection type display apparatus according to claim 1, further comprising a shifter configured to hold the optical system movably in a plane parallel to the imaging area, and
   wherein the information from the acquisition task includes a moving amount of the shifter relative to the optical axis of the optical system.

4. The projection type display apparatus according to claim 1, wherein the control task drives the tilt unit by the adjusting amount.

5. The projection type display apparatus according to claim 1, wherein the control task presents information on the adjusting amount.

6. The projection type display apparatus according to claim 1, further comprising the tilt unit.

7. The projection type display apparatus according to claim 1, wherein the tilt unit is attachable to and detachable from the projection type display apparatus.

8. The projection type display apparatus according to claim 1, wherein the information on the projection target includes distance information between the projection type display apparatus and the projection target.

9. The projection type display apparatus according to claim 1, wherein the information on the projection target includes tilt information of the projection target.

10. The projection type display apparatus according to claim 1, wherein the control task acquires the adjusting amount so as to reduce a difference between a position in an optical axis direction of a predetermined position on the projection target and the position in the optical axis direction of a position on the in-focus plane corresponding to the predetermined position.

11. The projection type display apparatus according to claim 1, wherein the control task acquires the adjusting amount so as to reduce a difference between an average position of a plurality of predetermined positions in the projection target in an optical axis direction and an average position on the in-focus plane in the optical axis direction of a plurality of positions corresponding to the plurality of predetermined positions.

12. The projection type display apparatus according to claim 1, wherein the control task drives a diaphragm unit provided to the optical system and configured to adjust a passing light amount, based on a difference between a curvature amount of the projection target and the field curvature amount of the in-focus plane.

13. The projection type display apparatus according to claim 1, wherein the adjusting amount for the adjuster and a shift amount for the predetermined position in the imaging area of the optical system.

14. The projection type display apparatus according to claim 1, wherein the optical system is attachable to and detachable from the projection type display apparatus.

15. A projection display system comprising:
   an optical system that includes an adjuster configured to adjust a field curvature of an in-focus plane of a projection image; and
   at least one processor or circuit configured to execute a plurality of tasks including:
   an acquisition task configured to acquire position information of a predetermined position in an imaging area of an image generator and an optical axis of the optical system; and
   a control task configured to acquire an adjusting amount of a tilt unit configured to tilt the in-focus plane, using information from the acquisition task, a field curvature amount of the in-focus plane based on a position of the adjuster, and information on a projection target.

16. A control method of a projection type display apparatus comprising the steps of:
   acquiring information on a projection target;
   acquiring a field curvature amount of an in-focus plane based on a position of an adjuster configured to adjust a field curvature of the in-focus plane of a projection image;
   acquiring position information of a predetermined position in an imaging area of an image generator and an optical axis of the optical system that includes the adjuster; and
   acquiring an adjusting amount of a tilt unit configured to tilt the in-focus plane, using information on the projection target, a field curvature amount of the in-focus plane, and position information of an optical axis of the image generator and the optical axis of the optical system.

17. A non-transitory computer-readable storage medium storing a program for causing a computer to execute a control method of the projection type display apparatus according to claim 16.

* * * * *